United States Patent
Evans et al.

[15] 3,705,960
[45] Dec. 12, 1972

[54] AUTOMATIC REPERTORY TELEPHONE DIALER WITH PERFORATED STRIP NUMBER STORAGE

[72] Inventors: Robert P. Evans, 151 Tremont St., Boston, Mass. 02129; Joseph P. Hussar, 74 Federal St., Weymouth, Mass. 02110; Gerald R. Evans, 11 Channing St., Newton, Mass. 02158; Robert T. Dunn, 4 Cedar Ridge Drive, Bedford, Mass. 01730

[22] Filed: Feb. 5, 1970

[21] Appl. No.: 9,028

[52] U.S. Cl. ............................ 179/90 R, 179/90 R
[51] Int. Cl. .............................................. H04m 1/45
[58] Field of Search........179/90 AD, 90 B, 90 BB, 90 BD, 179/90 CI; 340/365, 339; 178/17

[56] References Cited

UNITED STATES PATENTS 1,306,829  6/1919   Mellinger................179/90 B
3,118,975  1/1964   Sundra....................179/90 BB
3,322,904  5/1967   McCay....................179/90 AD
3,476,876  11/1969  Myrick.....................179/90 B
2,988,603  6/1961   Kumagai................179/90 CS
3,204,046  8/1965   Ries..........................179/90 B

*Primary Examiner*—Kathleen H. Claffy
*Assistant Examiner*—Thomas D'Amico
*Attorney*—Robert T. Dunn

[57] ABSTRACT

Telephone signalling apparatus stores sets of signals along stationary parallel adjacent lines each set being stored along a given line. The detector for the signals slides on a track with is transverse to the lines so that the detector can be moved to a selected line and the detector track is movable along a second track in a direction parallel to the lines. In a preferred embodiment, the detector is manually positioned along its track to the selected line and the track is then driven along the second track so that the detector moves along the selected line producing telephone call signals.

4 Claims, 21 Drawing Figures

PATENTED DEC 12 1972 3,705,960

INVENTORS
ROBERT P. EVANS
JOSEPH P. HUSSAR
GERALD R. EVANS
ROBERT T. DUNN

*Robert T. Dunn*
ATTORNEY

INVENTORS
ROBERT P. EVANS
JOSEPH P. HUSSAR
GERALD R. EVANS
ROBERT T. DUNN

Robert T. Dunn
ATTORNEY

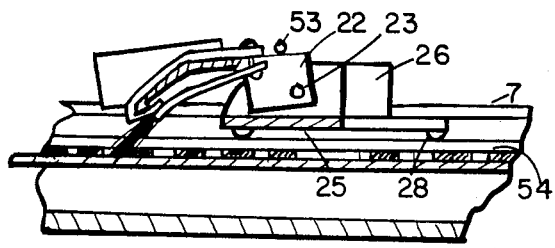
FIG 12
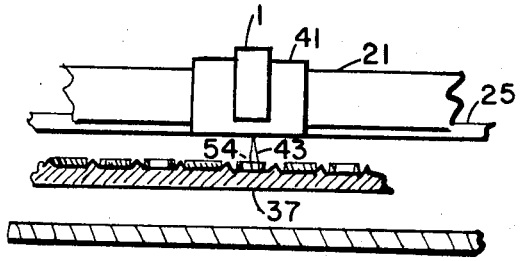
FIG 13
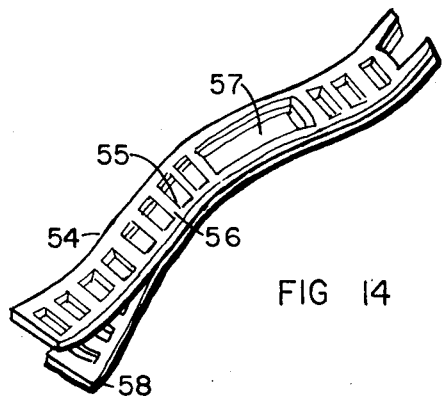
FIG 14
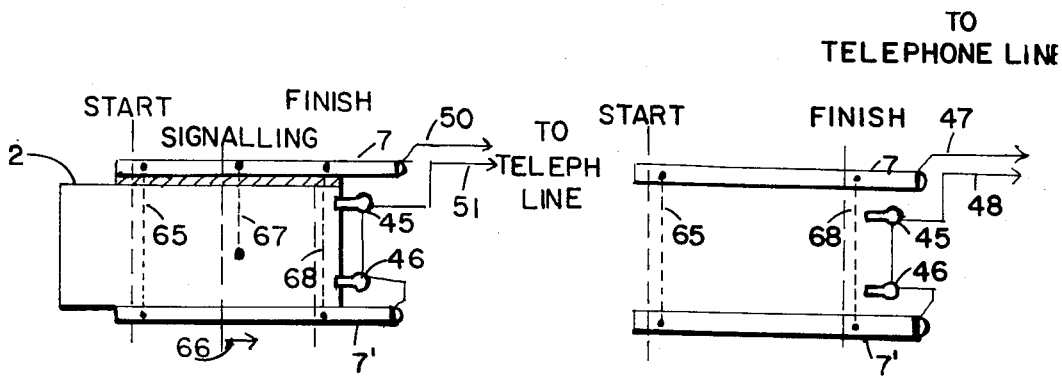
FIG 15
FIG 16
INVENTORS
ROBERT P. EVANS
JOSEPH P. HUSSAR
GERALD R. EVANS
ROBERT T. DUNN
*Robert T. Dunn*
ATTORNEY

AUTOMATIC REPERTORY TELEPHONE DIALER WITH PERFORATED STRIP NUMBER STORAGE

This invention relates to telephone signalling equipment and more particularly to apparatus for producing from a repertory of stored signals, a signal for calling a subscriber to an automatic telephone exchange.

A typical telephone subscriber commonly places a call to a limited number of stations which are called repeatedly and so each time a call is made the subscriber manually manipulates a dialing mechanism on his telephone set. The dial produces sets of pulses in the telephone line which represent the telephone number of the station being called. The pulses are produced in groups, each group representing an integer in the called telephone number and the dial must be manipulated to produce the pulses representing each integer. There are typically at least seven integers in a telephone number and so the dial must be manipulated seven times to make a typical call. This has been the mode of operation of telephone dialing in use now throughout the world for a great many years and it has long been recognized that there is a need for means to expedite the initiation of a telephone call by eliminating at least some of these manipulations.

It is an object of the present invention to provide a means capable of producing the signals for initiating a telephone call without the extensive manual operation mentioned above.

It is another object of the present invention to provide a means for storing a repertory of telephone numbers from which any number can be quickly selected and read automatically to produce the call signals in a telephone line without requiring the numerous manipulations mentioned above.

It is another object that the signals so produced in the telephone line are as effective as produced with the conventional manually manipulated dial mechanism.

Heretofore, one type of automatic telephone signalling equipment has been provided for use with the telephone which stores a repertory of telephone numbers listed sequentially on a long roll. The numbers are listed alphabetically on one side of the roll and on the back of the roll in substantial registry therewith the signals are stored magnetically. The roll is on a reel which turns manually or by a motor to place the selected number in a viewing area. When the selected number is so placed a magnetic head on the opposite side of the roll moves across the roll and detects the signals on the other side which represent the selected number. Pulses from the head actuate a switch which produces the signals in the telephone line equivalent to the dialing pulses produced by a manually operated dial. This equipment requires a drive mechanism for both the roll on which the numbers are stored, and the magnetic head which scans the back of the roll to detect the signals representing the number. The roll is intended for storing hundreds of telephone numbers and considerable manipulation is required to change the roll.

It has been noted that many subscribers have no need to store such a large number of telephone numbers and in many cases it would be more desirable to store fewer numbers at a time and to change the group of numbers stored from time to time, or even frequently, employing a less complicated and therefore, less expensive device than the above described equipment.

It is another object of the present invention to provide apparatus for producing call signals in a telephone line and in which the drive mechanisms are fewer and less complicated than in the above described equipment heretofore provided.

It is another object to provide such apparatus in which the stored telephone numbers can be changed readily.

It is another object to provide such apparatus in which all stored telephone numbers can be removed simultaneously and another group of stored telephone numbers substituted by a relatively simple manipulation.

It is a further object to provide such apparatus packaged with a low silhouette so as to fit beneath a typical desk telephone with parts that are manipulated being easily accessible to the operator of the telephone.

In accordance with principal features of the present invention whereby many of the above numerated objects of the invention are accomplished, a repertory of telephone numbers are stored along parallel adjacent lines on a substantially stationary storage plate which can be readily removed and for which a new plate can be readily substituted to change the group of telephone numbers stored. A detector is provided on a track so that the detector can be moved along the track manually and placed at a selected one of the lines. The detector track is in turn mounted on a second track so that it is moveable in a direction parallel to the lines and means are provided for driving the detector track along the second track so that the selected stored signal is detected and produced in the telephone line to make a call.

In the various embodiments of the invention, the individual stored telephone numbers are easily programmed by, for example, merely punching a few holes in a specially provided tape and then sticking the tape to the storage plate. The number of holes punched in the tape to program the tape for a specific telephone number need not be greater than the number of integers in the telephone number.

Other objects and features of the present invention will be apparent in view of the specific description of embodiments of the invention taken in conjunction with the figures in which:

FIGS. 12 and 13 are side and front sectional views, respectively, illustrating the action of the signal detector in an embodiment which detects by making electrical contact through a perforated tape;

FIG. 14 illustrates the programmed perforated tape;

FIGS. 15 and 16 are diagrams which illustrate electrical operation of the apparatus with and without the program plate, respectively;

Three embodiments of the present invention are described herein. They all store sets of signals along parallel adjacent lines on a plate and the plate remains stationary in the apparatus so long as it is used. In any of the embodiments, the plate can be changed and so the group of telephone numbers stored in the apparatus is changed. Furthermore, the numbers can be stored on both sides of the plate in any of the embodiments even though the specific description herein of two of the embodiments shows storage on only one side of the plate. In the three embodiments, the detector is manually positioned, so that it is aligned with the selected telephone number on the plate and for this purpose the detector track is provided along which the detector is manually positioned. The detector track is then driven parallel to the storage lines on the plate from the signalling start to the signalling finish position and then returned to the start position. The stored telephone number is signalled as the detector moves from the start position to the finish position.

In the first embodiment illustrated particularly by FIGS. 3 to 16, the detector consists of an electrical contact which contacts the plate (which is conductive) through perforations in a strip of insulating program tape. The conductive plate and the contact are connected directly to the telephone line and so as the contact touches the plate intermittently as it moves along the perforated tape, the signalling pulses are produced in the telephone line initiating the telephone call.

Figure 17:
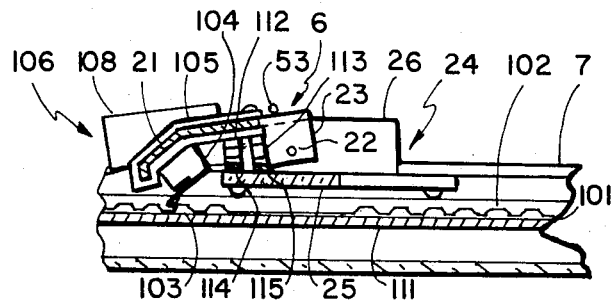
FIG. 17 illustrates operation of the detector in an embodiment which uses a micro switch to detect programmed protuberances on a tape.
Figure 18:
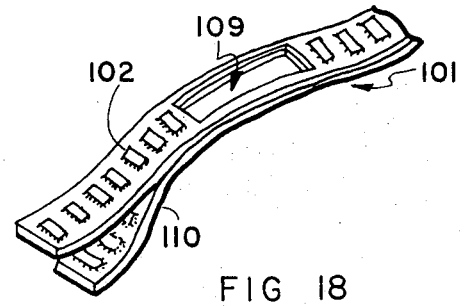
FIG. 18 illustrates the programmed tape with protuberances.

In accordance with another embodiment illustrated particularly by FIGS. 17 and 18, the detector is a microswitch which has an arm that is deflected by protuberances or embossments on a strip of tape. These protuberances represent the stored telephone number. Each time the arm is deflected, the microswitch opens. The switch is connected directly to the telephone line and so each time it opens and then closes, a pulse is produced in the telephone line to accomplish signalling.

Figure 19:
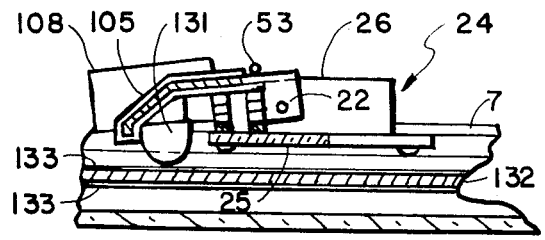
FIGS. 19 and 20 illustrate side and front sectional views of the detector in an embodiment using a magnetic head which detects programmed magnetic spots along a tape to initiate the signals in the telephone line for dialing.
Figure 20:
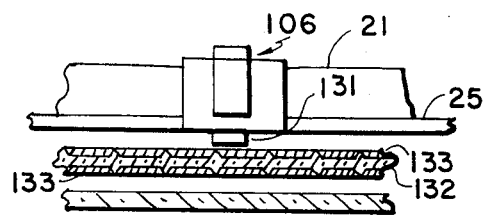
Figure 21:
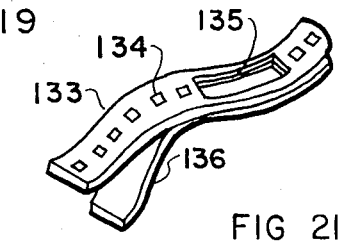
FIG. 21 illustrates the programmed tape with magnetic spots.

The third embodiment shown particularly in FIGS. 19 to 21 employs a magnetic head for detecting magnetic spots along a tape. For this purpose, the tape may be magnetic tape which is perforated. The locations of the perforations define the integers in the telephone number stored. FIG. 20 shows the plate with such magnetic storage on both sides so that the plate need only be removed, turned over and reinserted in the apparatus to change the group of telephone numbers ready in the apparatus for signalling.

Figure 1:
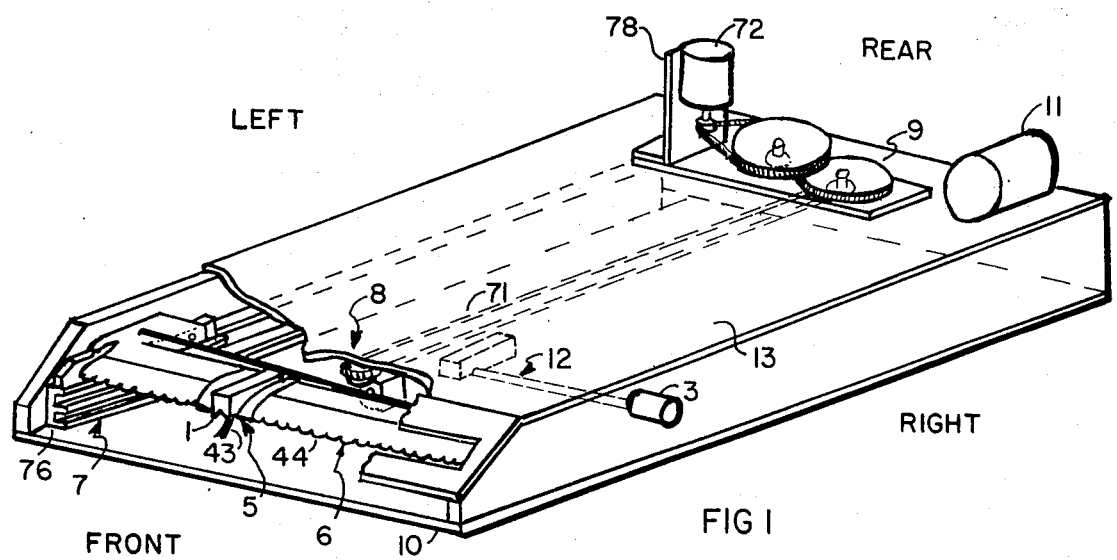
FIG. 1 is an isometric view of one embodiment showing the apparatus with the program plate removed and the cover partially broken away to reveal some of the principal parts thereof.
Figure 2:
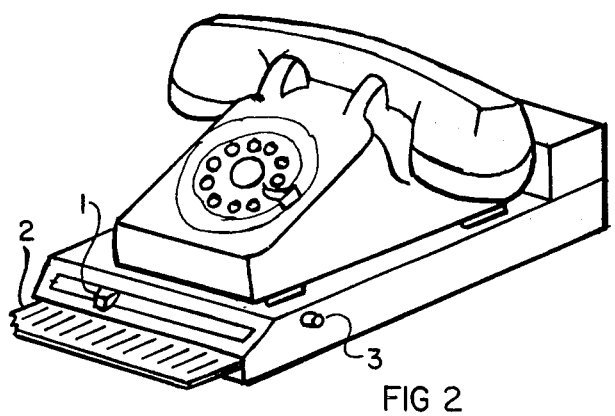
FIG. 2 is an isometric view showing the apparatus disposed under a typical desk telephone to demonstrate the relatively low silhouette and convenience of use.

FIG. 1 shows the apparatus with part of the cover removed at the front to reveal the transverse track and detector and part of the cover removed at the rear to reveal the drive mechanism. In FIG. 2, the apparatus is shown placed beneath a standard desk telephone and illustrates the easy access to the manually operated telephone number selector knob 1 by which the detector is moved along the telephone number program plate 2 that projects from the device to select a telephone number from the group stored on the plate. Thereafter, the operator lifts the telephone receiver and presses the button 3 momentarily to initiate the automatic signalling of the selected telephone number. A multitude of program plates such as plate 2 can be stored beneath plate 2 in the apparatus and from these any desired plate can be selected and substituted for plate 2 to place the set of telephone numbers on the selected plate in a ready position for dialing. Thus, the operator can select a plate from a library of plates on which frequently used telephone numbers are stored and this is done simply by sliding out one plate and sliding in another in its place.

FIG. 1 shows the principal assemblies of the apparatus with the program plate removed. These include the detector 5; the detector track 6, also referred to herein as the transverse track because the detector is moved along it in directions transverse to the line of storage of the telephone numbers on the plate; the left and right side tracks 7 and 7', also called herein the parallel tracks because they are parallel to the lines of storage of the telephone numbers; the transverse track drive coupling 8; the drive mechanism 9; the base platform 10 on which the side tracks are mounted; the battery 11 which energizes the motor drive mechanism; the switch assembly 12 which includes the button 3 by which the motor is electrically coupled and decoupled to the battery; and the top cover 13 to which the transverse track coupling 8, drive assembly 9, battery 11 and switch assembly 12 are mounted. Further illustration of these parts and the details thereof are shown in FIGS. 3 to 13.

Figure 3:
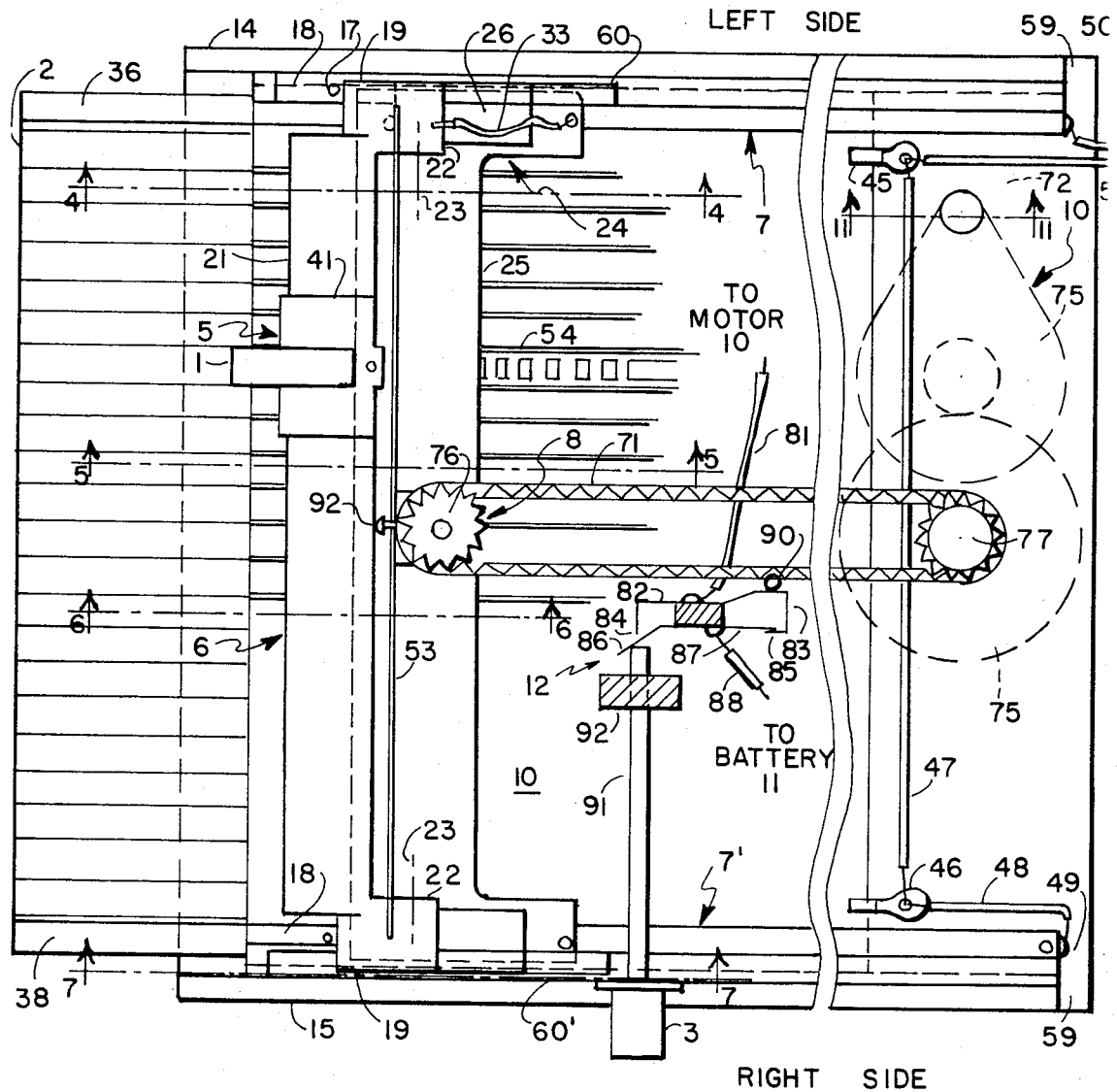
FIG. 3 is a plan view of the apparatus in FIG. 1 with the top cover removed showing the various parts thereof.
Figure 4:
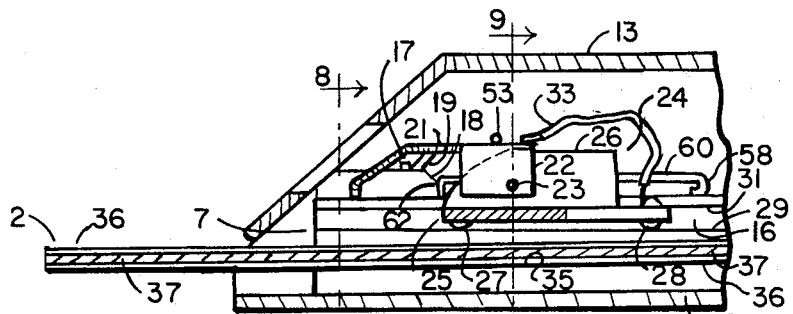
FIGS. 4 to 7 are side sectional views taken as shown in FIG. 3.
Figure 5:
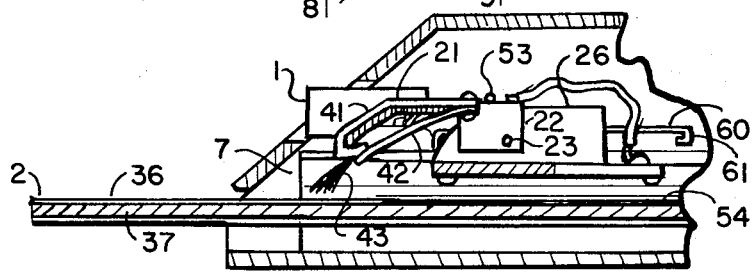
Figure 6:
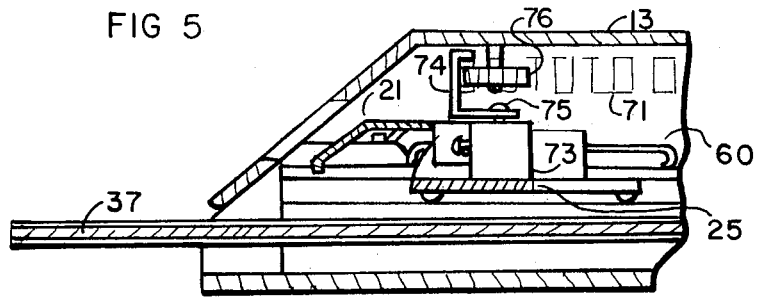
Figure 7:
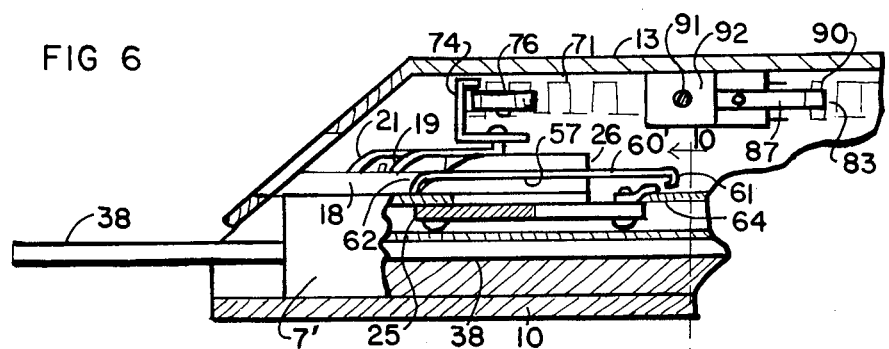
Figure 8:
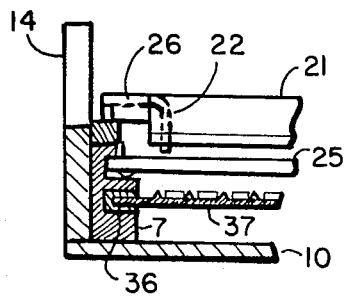
FIGS. 8 and 9 are front sectional views taken as shown in FIG. 4.
Figure 9:
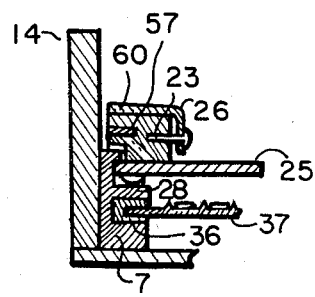
Figure 10:
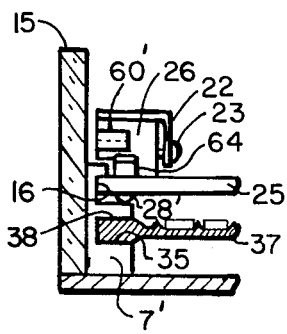
FIG. 10 is a rear sectional view taken as shown in FIG. 7.

FIG. 3 is a top view of the apparatus with the top plate 13 removed except along the rear of the apparatus where the drive mechanism and battery are located. The tracks 7 and 7' are located along the edges of the base 10 against the side walls 14 and 15. The side walls 14 and 15 may be part of the base plate 10 or part of the top plate 13. The transverse track assembly 6 rides along groove 16 in each of the tracks and abuts stops at the front end of each track including stop post 17 and cam 18. Each cam provides a ramp which guides a lift arm 19 on each end of the detector track 21. The detector track 21 may be formed from sheet metal cut and bent as shown. It includes at each end the arms 19 designed to ride up the cam ramps 18 and abut the stops 17 and so pivot the yokes 22 on axles 23. Each axle is carried by the the transverse track carriage 24 which may be entirely made of plastic or a suitable electrically insulating material. The carriage 24 includes a cross member 25 and end blocks 26. The axles are mounted to the end block.

The ends of the carriage cross member 25 extend into the grooves 16 in the tracks 7 and 7' and so engage the grooves. At each end of the cross member are located two spring loaded buttons 27 and 28 which are forced downward by their springs against the bottom wall 29 of the grooves 16 in which the carriage rides and in so doing force upward against the top wall of the grooves the upper end surfaces of the carriage cross member 25. On the left side of the apparatus, the button 28 is connected by a lead 33 to the adjacent yoke 22 and serves to maintain electrical connection between the cross track 21 and and the track 7 on the same side of the apparatus. The side tracks 7 and 7' or at least the bottom wall 29 of the grooves in these tracks are electrically conductive and provide a low impedance path from the buttons 28 and 28' to the adjacent tracks 7 and 7'.

Below each of the grooves 16 in each side track is another groove 35 into which the program plate 2 slides and by which the plate is held beneath the carriage and detector track firmly in position. The plate grooves 35 are formed in the side tracks 7 and 7' parallel with the carriage grooves 16. Thus, each side track contains two grooves, a carriage groove and a program plate groove. It is convenient to make each of the side tracks from a length of extruded metal. This being the case, the program plate 2 in the first embodiment of the invention illustrated particularly by FIGS. 3 to 13 must be electrically insulated from the left side track 7 into which it slides. This is necessary, because in this embodiment the plate 2 is electrically conductive and is part of the electrical circuit of the apparatus. Accordingly, along the left edge of the program plate 2 there is an insulative coating 36 to insulate the metallic portion 37 of the plate from the left side track 7.

The detector assembly 5 slides along the transverse track 21 and includes a selector knob 1 by which the track is manually manipulated; a sleeve 41 which is fit to the contour of the detector track 21 so that it securely, but slideably engages the track along the top thereof; an adjustable bar 42 which connects from the back to the front of the sleeve 41 beneath the track 21; and the brush contact 43 that is mounted beneath the sleeve where the sleeve engages the bar 42. The detector track 21 may be notched along the front edge 44 as shown in FIG. 1 so that the detector 5 moves easiest into the notches when it is manipulated and, thereby, ensures alignment of the brush 43 with a desired line on the program plate 2. Friction between the detector assembly 5 and the track 21 is adjusted by bending the bar 42 toward the track or away from it so that the track is squeezed more tightly or less tightly between the bar 42 and the sleeve 41. In this manner, the friction between the detector assembly and detector track is maintained and positive electrical contact between the two is also maintained. Thus, the contact brush 43 is at all times in electrical contact with the left side track 7 through the track 21, yoke 22, lead 33 and contact button 28.

The program plate 2 when inserted fully into the grooves 35 in the side tracks 7 and 7' makes contact at the rear of the apparatus with clips 45 and 46 mounted to the base plate. These clips serve as mechanical stops for the program plate and also make electrical contact to the plate. Thus, the apparatus provides an electrical circuit from the left side track 7 through the contact brush 43 and from the contact 43 to the program plate and to the clips 45 and 46 whenever the brush comes in contact with the plate. This is a low impedance circuit and is in effect a short circuit when the brush contacts the plate. The circuit is also completed when the arms 19 that extends from the transverse track 21 contact the cams 18 as shown in FIGS. 3 to 8.

The right edge of the program plate 2 need not be insulated from the right side track 7'. In fact, the plate should be short circuited to the right side track 7' at all times and this is ensured by electrical lead 47 connecting clips 45 and 46 and lead 48 connecting clip 46 to the right side track 7' at 49. The leads 50 and 51 connect the circuit across the two side tracks in series with the telephone line. This circuit is connected in series with the lead in the telephone line which normally carries the dialed signalling pulses. The circuit breaks intermittently producing signalling pulses when the transverse carriage and track are moved steadily from the start position shown in FIGS. 3 to 8 on the way toward the finish position at the rear of the apparatus.

The signalling position is illustrated in FIGS. 12 and 13 in which the detector track arms 19 have come off the cams 18 and the carriage is being driven along the side tracks 7 and 7' from the start position at the front of the apparatus toward the finish position at the rear of the apparatus. When the arms come off the cams, a spring 53 acting against the top of the yokes 22 at the ends of the detector track compels the yokes and track to pivot about the axels 23 placing the contact brush 43 against the program plate 2. As the carriage is driven from the start position to finish position, the contact brush 43 rides along a selected channel on the plate along which a program strip such as 54 has been laid down. The program strip, shown in FIG. 14, consists of a strip of tape containing perforations such as 55 through which the brush contacts the conductive part 37 of the plate. So each time the brush rides over a cross part 56 of the tape which defines the perforations, the circuit between tracks 7 and 7' is broken and a pulse is produced in the telephone line. The tape 54 in this embodiment is provided with the perforations 55 uniformally spaced to produce the pulses defining each integer in the stored telephone number. A number of cross parts 56 are punched out as at 57 to provide an interval between the groups of pulses that define the integers in the telephone number. The tape may have an adhesive on one side and protective back 58 which is peeled from the tape adhesive after the cross parts are punched out. Then the tape is laid down on the program plate.

The circuit between the tracks 7 and 7' is normally closed and must be maintained so in order not to set up false signals in the telephone line. As soon as the telephone receiver is lifted, the lead in the telephone line in series with this circuit in the apparatus is energized and so the circuit in the apparatus must be maintained a short circuit at all times except when producing the pulses which accomplish signalling.

Figure 11:
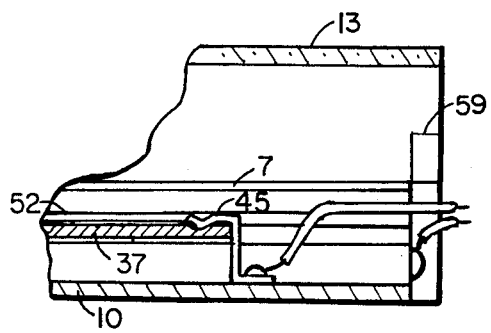
FIG. 11 is a side sectional view taken as shown in FIG. 3.

As mentioned above, the circuit from the left side track 7 to the brush contact 43 is always closed, because the sleeve 41 contacts the detector track 21 which is electrically connected on the left side directly through the yoke 22 and lead 33 to contact button 28 that rides in the left side track groove 16. However, the right side track 7' is not always electrically connected to the detector track 21, but is always electrically connected to the program plate 2 when the plate is inserted in the apparatus for use. Thus, when the plate is inserted for use and contacts the clips 45 and 46 at the rear of the apparatus, the right side track 7' and the clips 45 and 46 are all electrically connected. Both of the clips 45 and 46 appear as shown in FIGS. 3 to 11. FIG. 11 is a side view showing the clip 46 taken as shown in FIG. 3 and illustrates how the plate abuts the clip when inserted and the clip contacts the metallic surface 37 of the plate. Thus, the clips 45 and 46 provide stops for the program plate, hold the plate in position and make positive electrical contact to the metallic part 37 of the program plate. This same contact between the clips 45 and 46 and the plate could also be made through the contact of the edge 38 of the plate in the groove 16 of the right side track 7', because both clips are directly connected to track 7'. However, a direct electrical short between the plate and track 7' may not always be accomplished or if both sides of the program plate are used to store programs, it may be necessary to insulate both edges of the program plate so that either edge can be inserted along the channel 16 in the left side track 7.

At the start position shown in any of the FIGS. 3 to 8, the contact brush 43 connects electrically directly to both of the tracks 7 and 7'. The connection to track 7 is through the lead 33 and button 28 riding in the track groove 16. The connection to track 7' is through the arm 19 in contact with the cam 18 which is in contact with the track 7'. Thereafter, when the carriage 24 carrying the detector track and contact is driven from the start position at the front of the apparatus toward the rear of the apparatus, the arms 19 come off their cams 18, and the brush contact 43 contacts the program strip 54 laid down on the program plate as shown in FIG. 12. The brush 43 still remains electrically connected to track 7 by virtue of the lead connection 33 and button 28. However, the brush is no longer connected electrically to track 7' because the arms 19 have come off cams 18. However, the brush 43 intermittently contacts the conductive plate 37 through the perforations 55 in the program tape 54 and so produces signalling pulses.

When the carriage reaches the finish position at the rear of the apparatus, it stops and returns to the start position by the action of the drive assembly 9 and coupling 8 as is described hereinbelow. On the return from the finish position to the start position, the contact brush 43 must be lifted from the tape program so that it will not drag. This is accomplished by pivoting the transverse track 21 at the axels 23 through the track yokes 22. The pivoting is accomplished by the action of left and right side cam rods 60 and 60' which slides in grooves 57 in end blocks 26. The cam action of each of the cam rods 60 and 60' is the same, that is, just before the carriage reaches the finish position at the rear of the apparatus, the rear ends 61 of the cam rods abut stops 59 at the ends of the tracks 7 and 7'. When the ends of the cam rods abut the stops and the carriage continues on to the finish position, the cam rods are pushed forward in their slots in the end blocks 26 causing the front ends 62 of the cam rods to engage the arms 19, lifting the arms and thus pivoting the transverse track 21 about the axels 23. Thus, upon reaching the finish position, the cam rods cause the transverse track to pivot lifting the brush contact 43 from the program plate. Immediately thereafter, the drive mechanism drives the carriage carrying the detector track and detector assembly back to the start position with the contact brush 43 held up from the program plate 2. During this return trip it is still essential that the short circuit across the two output leads 50 and 51 be maintained. The connection between track 21 and right side track 7' during the return is made through the right cam rod 60'. Cam rod 60' during the return is in its forward position so that the forward part slides against and lifts the arm 19. Simultaneously, when the cam rod slides to its forward position lifting the arm 19, the rear end 61' makes contact with contact 64 connected to the right side button 28' in contact with the inside of the groove 16 in the track 7'. Thus, cam rod 60' serves along with cam rod 60 to lift the contact brush 43 from the program plate and in addition 60' provides electrical contact from the detector track 21 to the track 7' during the return of the carriage.

The electrical performance of the apparatus at the start position and at the finish positions and at a dynamic signalling position inbetween are illustrated in FIGS. 15 and 16. FIG. 15 represents electrical operation with the program plate in position in the apparatus. The heavy broken lines in FIG. 15 represent the position of the detector track at the positions denoted start, finish and signalling. At the start position, the circuit from lead 50 to 51 is a short circuited from track 7 through the detector track 21 to track 7' as represented by the broken line 65, because at this position the arms 19 at each ends of the track are in contact with the cams 18 connected to the tracks 7 and 7'. When the transverse or detector track is in motion in the direction of arrow 66 at a signalling position, contact is made directly from track 7 to the transverse track to the brush contact 43 which contacts the program board 2 and so short circuits are produced across the lines 50 and 51 whenever the brush contacts the program board through the perforations in the program tape. This circuit is represented by the broken line 67. Upon reaching the finish position, when the cam rods take action and lift the brush contact from the program board, contact is made from the detector track 21 through right side cam rod 60', contact 64 and button 28' to the groove 16 in track 7' and in this manner a short circuit is provided across the leads 50 and 51 and this short circuit continues during the return of the carriage until taken over by the short circuit at the start position.

As has been mentioned, it is necessary that the short circuit across the leads 50 and 51 be maintained at all times except when signalling and this includes on the occasions when the program board 2 is removed from the apparatus. FIG. 16 illustrates the electrical conditions by which this short circuit is maintained when the program board is removed from the apparatus. As has already been noted, at the start and finish positions, the short circuit does not go through the program plate and so at these positions the short circuit is maintained in the same manner as when the program plate is inserted. At any position of the transverse track inbetween these, there is an open circuit.

The carriage is driven from the start to finish positions and then back to the start position by the action of the drive coupling 8 which connects the carriage to the belt 71, the drive assembly 9 which engages the belt and the switch assembly 12 which connects the electrical output of the battery 11 to the motor 72 in the drive assembly. The drive coupling, shown most clearly from the top in FIG. 3 and from the side in FIG. 6, includes a block 73 fixed to the carriage cross member 24 substantially at the center thereof, a swivel coupling 74 pivotally attached to the top of the block by pin 75 and also pivotally attached to the belt 71. The belt engages idler pulley 76 attached to the top plate 13 at the front of the apparatus and by drive pulley 77 also attached to the top plate, but at the rear of the apparatus. The swivel coupling, pivotally connected to both the block 73 and the belt 71 follows the belt around both the pulleys and pulls the carriage along with it. In this manner the carriage is driven from the start position to the finish position and returned to the start position while the drive pulley 77 is driven in a given direction continuously and so the motor 72 which engages the drive gear 77 by suitable arrangement of pulleys and gears all of which are denoted 75, need only drive in one direction from start to finish and back to the start position. The drive pulleys and gears 75 and the motor 72 are mounted to a bracket 78 as shown in FIG. 1.

One terminal of the motor 72 is connected directly to the ground of the battery 11. The other terminal of the motor connects via the lead 81 to the arms 82 and 83 of normally open switch 84 and normally closed switch 85, respectively. The other arms 86 and 87 of the switches 84 and 85, respectively, connect to lead 88 which connects to the live terminal of the battery 11.

In operation, when the carriage assembly 24 is at the start position as shown in FIG. 3, a cam 90 on the belt 71 rides against the arm 83 of switch 85 holding the switch open. The normally open switch 84 is also open and so the motor is not energized. Upon pressing the button 3 momentarily, the rod 91 which extends from the button 3 through guide block 92 supported beneath the top plate 13 and against the arm 86 of switch 84 momentarily closes the switch energizing the motor. Immediately, the motor drives the belt 71 and the cam 90 moves past the arm 83 releasing the arm so that switch 85 closes and so the motor continues to be energized even though the rod 91 has been released and normally open switch 84 returns to its open position. The motor continues to drive in one direction causing the carriage to move down the tracks 7 and 7' to the finish position at the rear of the apparatus and then returns to the start position. As the carriage reaches the start position again, the cam 90 again engages the arm 83 and opens the switch 85 switching off the motor.

The spring 53 which extends between the yoke 22 of the detector track 21 acts against a screw 92 in the block 73 and tends to pivot the brush contact 43 downward against the program plate. When the arms 19 of the detector track ride against the cams 18 or are lifted by the cam rods 60 and 60' they act against the spring 53. Thus, all positions of the transverse track are held under a spring load and so they are held firmly and the track has little tendency to vibrate.

The second embodiment of the invention is illustrated in FIG. 17. This is a side sectional view of an apparatus identical to the first embodiment described above with reference to FIGS. 1 to 14 except for differences noted below. In the second embodiment, the program consists of a pattern of protuberances on a program plate. The protuberances are laid down in program strips just as in the first embodiment and can be formed by the perforated tape, such as shown in FIG. 14, or the tape shown in FIG. 18 can be used. The tape in FIG. 18 denoted 101 contains discrete uniformally spaced embossments such as 102. The embossments deflect the arm 103 of the microswitch 104 mounted to the sleeve 105 in the detector assembly 106. This detector assembly is similar to detector assembly 5 described above with reference to FIG. 1 in that it is manually positioned by sliding along the transverse track 21 so as to be aligned with the selected telephone number program. The knob 108 is provided for manipulating the detector assembly. Strips of tape such as 101, containing uniformly spaced embossments 102 is first punched as at 109 to remove sections of embossments between groups of embossments such as the first group of seven at one end of the tape 101. The groups of embossments define each of the integers in the telephone number which is programmed on the tape. Next, the back 110 is peeled from the adhesive side of the tape and the tape is laid down on the program plate 111 which need not be electrically conductive. The program plate 111 has the same shape and is inserted in the apparatus just as plate 2 as described in the first embodiment.

The microswitch 104 has two leads. One makes contact with one of the output leads from the apparatus and the other makes contact with the other output lead (not shown). The switch is a normally closed switch and so it short circuits the output leads except when the arm 103 is deflected by one of the protuberances 102. When sufficiently deflected by the protuberance, the switch opens and so a pulse is produced in the output. The detector track carriage 24 and detector track assembly 6 and tracks 7 and 7' are identical to those described in the first embodiment and include cam rods 60 and 60' for rotating the track assembly 6 about the axles 22 to tilt the transverse track upward and lift the arm of the microswitch up and off the programmed tape 101.

The detector assembly sleeve 105 in this second embodiment is made of non-conductive material and carries two contacts 112 and 113 which slideably contact conductive strips 114 and 115 along the top of carriage cross member 25. These conductive strips run the length of the cross member 25 and one electrically connects with button 28 riding in track 7 while the other electrically connects with button 28' riding in track 7'. Thus, one of the leads from the microswitch 104 electrically connects and short circuits to track 7 and the other to track 7'. The output leads connect to these tracks and so the switch short circuits the output each time the lever 103 is deflected by a protuberance 102 and so produces a signalling pulse in the output.

Clearly, either the tape shown in FIG. 18 embossed with the protuberances 102 can define the program in apparatus including the microswitch as shown in FIG. 17, or the program can be provided by perforated tape such as shown in FIG. 14. In the latter case, the microswitch arm is deflected when it moves between perforations.

The third embodiment of the present invention is illustrated in FIGS. 19 to 21. In this embodiment, the carriage assembly 24 and detector track 6 can be constructed exactly as in the embodiment which employs a microswitch in the detector assembly, except that a magnetic pickup head 131 is substituted for the microswitch 104. The two leads from the head connect electrically to the track 7 and 7' in the same manner as the microswitch leads and the detector sleeve 105 is the same. The difference lies in the use of a magnetic detector and storage of the telephone numbers by a pattern of magnetically permeable spots on the program plate 132. The magnetically permeable spots may be on strips of tape laid down on the plate 132. Such a strip of tape 133 is shown in FIG. 21. The spots 134 on the tape are uniformly spaced down the center of the tape. A punch is used to punch out the spots between groups of spots, each group representing an integer in the telephone number that is stored. Thus, a space or interval between the first group of spots representing the number 6 on the tape shown in FIG. 21 and the next following group is spaced by a hole 135 punched in the tape. In this manner, the telephone number is programmed on the tape and then the backing 136 is removed from the adhesive side of the tape and the tape is laid down on the program plate 132. The program plate need not be electrically conductive and telephone number tape programs can be applied to both sides of the plate as just described.

In operation, when the carriage is driven along the tracks 7 and 7', just as already described in the first embodiment, the detector track assembly 6 pivots on the axles 22 lowering the head 131 against the selected program strip. As the head moves over each of the magnetically permeable spots 134 a single pulse is produced across the tracks 7 and 7'. Electrical leads (not shown) connect the tracks 7 and 7' to the input of an amplifier which in turn energizes a solenoid switch and the output from the solenoid switch connects to the telephone line producing signalling pulses in the telephone line when the solenoid switch closes and opens. Each time the head moves across a spot, the pulse across the track 7 and 7' is amplified and the amplified pulse energizes the solenoid causing the solenoid switch to open. Normally when no pulse is produced across the track 7 and 7', the solenoid switch is closed maintaining a short circuit in the telephone line.

The three embodiments of the present invention described herein have in common a program plate storing electrically, mechanically or magnetically a pattern which represents a number of telephone numbers each along a designated line on the program plate and a detector which is manually moved to select a line and then automatically driven along the line produces signals which are coupled to the telephone line to signal the telephone number selected. These are the best known uses of the invention and illustrate the principals thereof.

What is claimed is:

1. An automatic telephone dialing device comprising, means including a conductive plate stationary in the device containing a multitude of parallel channels side by side for storing sets of signals along parallel adjacent lines, each set of signals being stored as a pattern of openings in a strip of insulator material which is removably placed in a channel and stationary therein, an electrical contact for detecting any selected one of the sets of stored signals on a strip by moving along the strip in close proximity thereto so that the contact touches the plate intermittently through the pattern of openings in the selected strip, a first track for the contact along which the contact is movable in a direction transverse to the channels, a second track for the first track along which the first track is movable in a direction parallel to the channels, and means for coupling the plate and electrical contact to a telephone line whereby signals are produced in the telephone line in a manner such that each set of signals produced in the telephone line is a train of electrical pulses including groups of pulses separated by intervals, the number of pulses in each group signifying a digit of a telephone number called.

2. A signalling device as in claim 1 and in which, the strips are lengths of adhering tape laid on the plate in the channels, each strip defining one telephone number.

3. A signalling device as in claim 2 and in which, the tape is perforated and the electrical contact intermittently touches the plate through the perforations as the contact moves along the tape to produce the signals in the telephone line.

4. A signalling device as in claim 3 and in which, groups of uniformly spaced perforations in a length of tape produce the groups of pulses, the groups of perforations are spaced from each other by interval perforations, and the movement of the contact along the tape is such that the time of contact of the contact with the plate through an interval perforation is substantially longer than the time of such contact through a group perforation.

* * * * *